United States Patent [19]

Lundquist et al.

[11] Patent Number: 4,720,410
[45] Date of Patent: Jan. 19, 1988

[54] HEAT-ACTIVATED BLOTTER

[75] Inventors: Burton R. Lundquist, Scottsdale; Randal J. Monforton, Phoenix, both of Ariz.

[73] Assignee: Conagra, Inc., Omaha, Nebr.

[21] Appl. No.: 938,583

[22] Filed: Dec. 5, 1986

[51] Int. Cl.⁴ .................. B32B 3/10; B32B 27/12; B65D 81/34
[52] U.S. Cl. .................. 428/136; 55/387; 99/425; 206/204; 206/497; 426/107; 426/113; 426/124; 426/129; 428/198
[58] Field of Search ............. 34/80; 53/442; 55/384, 55/387; 99/425, 444; 206/204, 205, 497, 524.2, 524.3; 426/107, 113, 121, 124, 129, 234; 428/136, 198

[56] References Cited

U.S. PATENT DOCUMENTS

| | | | |
|---|---|---|---|
| 3,026,209 | 3/1962 | Niblack et al. | 99/174 |
| 3,342,613 | 9/1967 | Schelhorn | 428/198 |
| 3,619,215 | 11/1971 | Bard et al. | 99/174 |
| 3,809,223 | 5/1974 | Kendall | 206/204 |
| 3,834,606 | 9/1974 | Andersson | 206/204 |
| 3,916,030 | 10/1975 | Bard et al. | 426/113 |
| 4,141,487 | 2/1979 | Faust et al. | 229/43 |
| 4,210,674 | 7/1980 | Mitchell | 426/107 |
| 4,275,811 | 6/1981 | Miller | 206/204 |
| 4,321,997 | 3/1982 | Miller | 206/204 |
| 4,361,227 | 11/1982 | Paulucci | 206/45.32 |
| 4,382,507 | 5/1983 | Miller | 206/204 |
| 4,404,241 | 9/1983 | Mueller et al. | 428/35 |
| 4,410,578 | 10/1983 | Miller | 428/117 |
| 4,505,961 | 3/1985 | Lu | 428/35 |
| 4,596,713 | 6/1986 | Burdette | 426/124 |
| 4,652,490 | 3/1987 | Arita | 426/129 |

*Primary Examiner*—Jimmy G. Foster
*Attorney, Agent, or Firm*—Willian Brinks Olds Hofer Gilson & Lione Ltd.

[57] ABSTRACT

The present invention is an absorbent pad for use below a meat product or the like during storage and during cooking. The pad includes a blotter means adapted to absorb liquids released from the meat product during cooking. In order to prevent substantial absorption prior to cooking, the pad also includes a heat shrinkable film adjacent the top surface of the blotter means, which film is partially attached to the blotter so as to leave at least one area which is not attached to the blotter means. The film also includes at least one opening feature, i.e. a perforation or pre-weakened area, in the at least one area which is not attached to the blotter means. As a result, when the pad is subjected to heat during cooking, the film around the perforation to weakened point shrinks so as to open a hole through the film to thereby allow liquids released from the meat product to pass into the blotter. Various configurations of perforations and pre-weakened areas are described.

13 Claims, 9 Drawing Figures

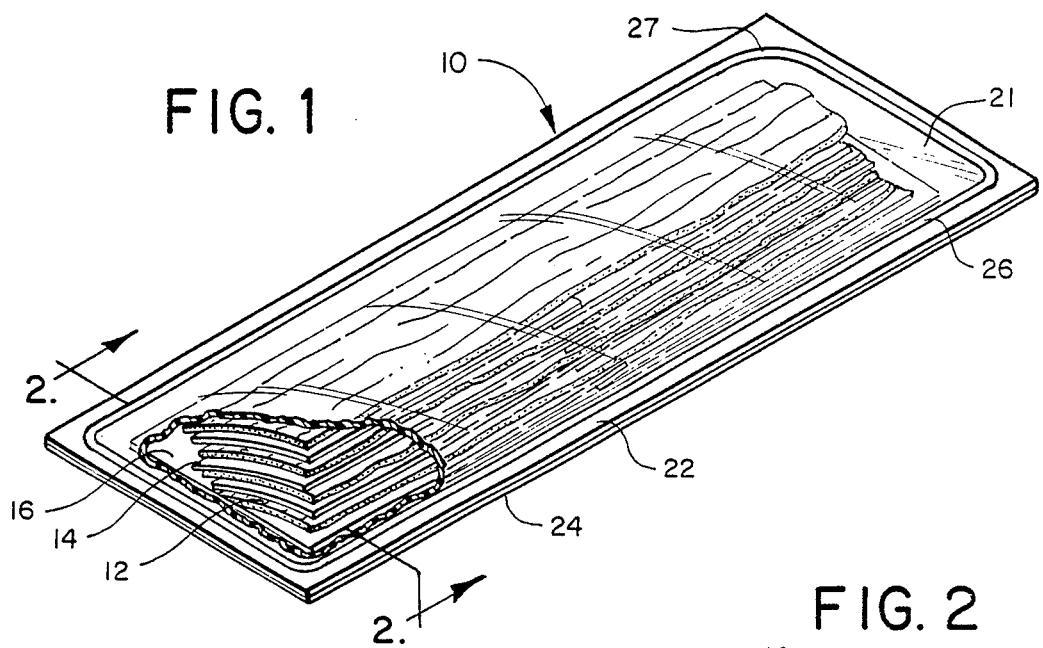
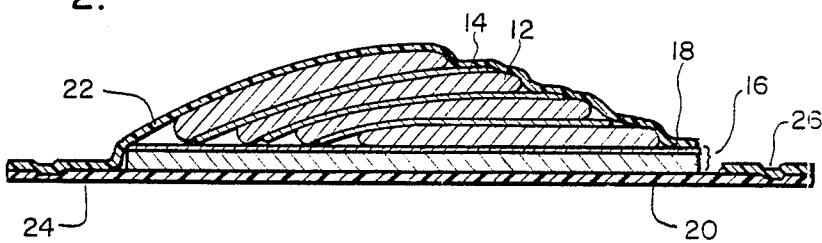
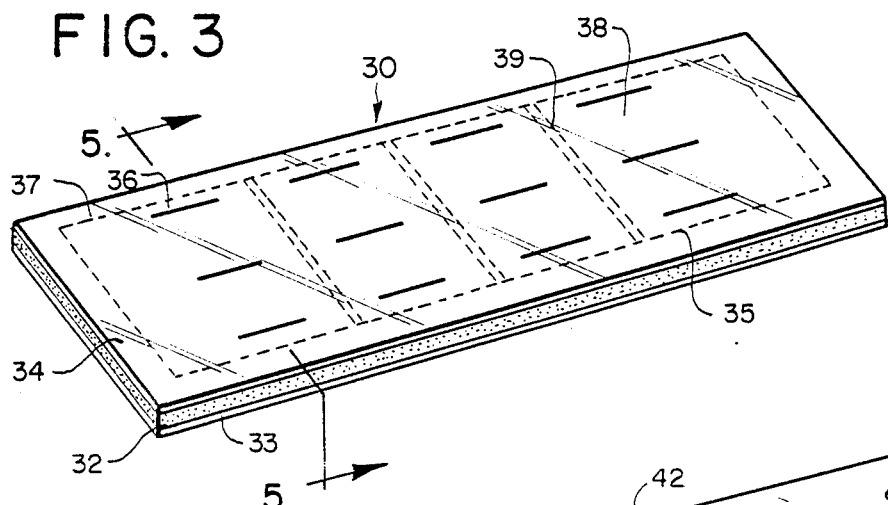
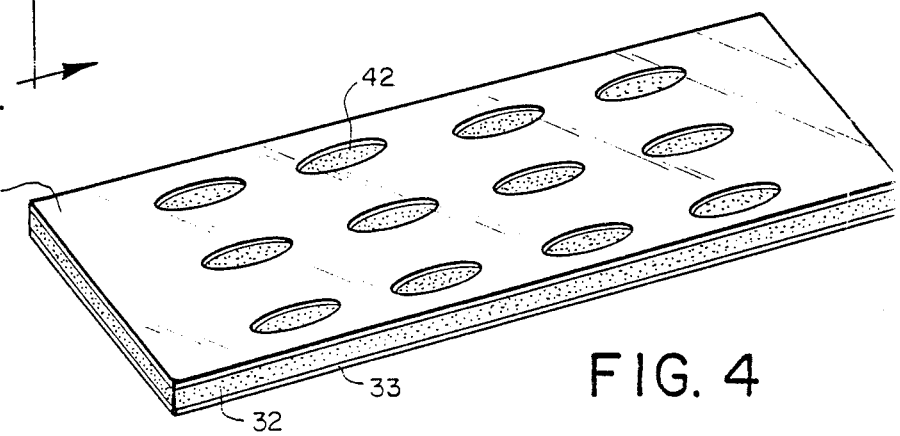
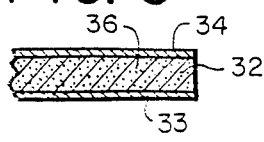

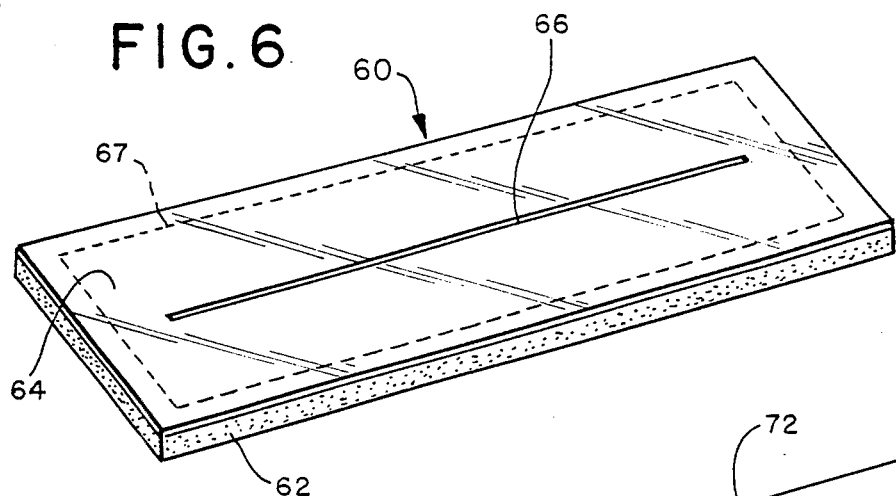
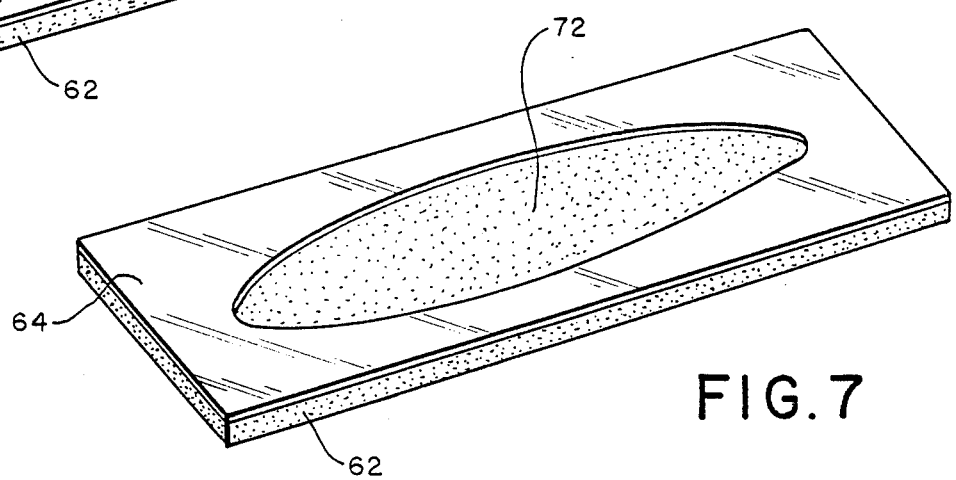
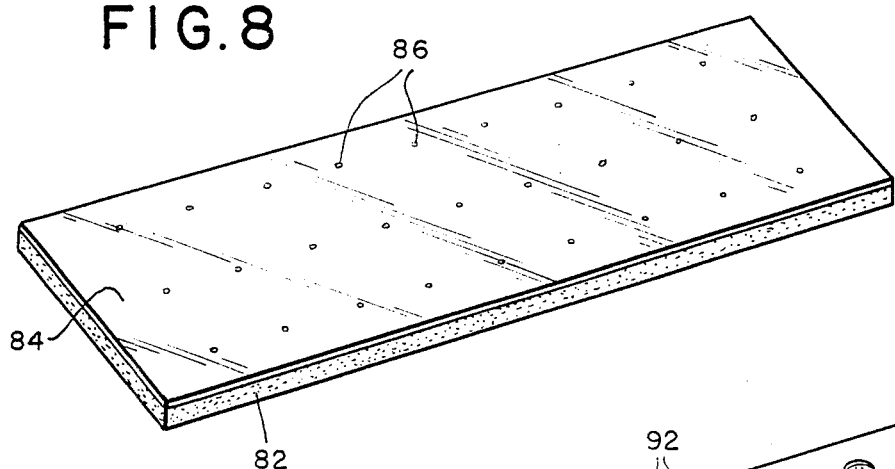
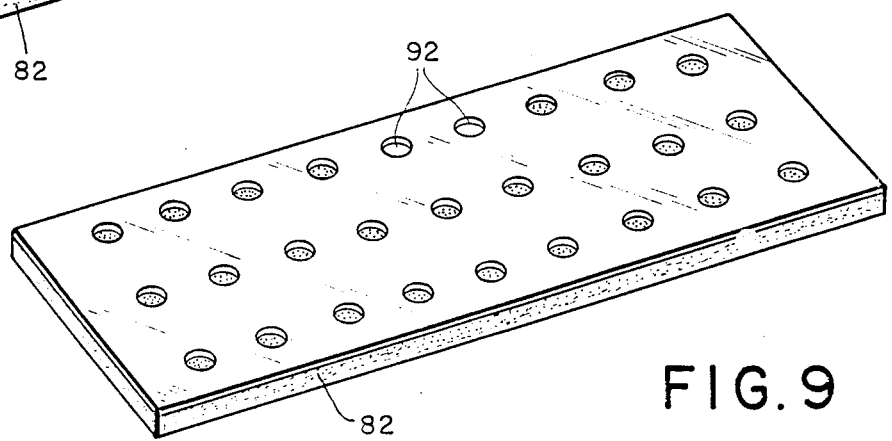

HEAT-ACTIVATED BLOTTER

BACKGROUND OF THE INVENTION

The present invention relates to the field of packaging for meat products and the like. More particularly, the present invention relates to blotters, or absorbent pads, for use in packages for meat products and the like, which packages are adapted to contain the product not only during storage, but also during cooking.

Various attempts in recent years have been directed to designing food packaging which not only serve as packaging for the product during storage, but which can also be used to contain the product during cooking. Examples of such food packaging are TV dinners, boil-in bags, etc.

This trend toward dual packaging has become even more popular since the advent of the microwave oven. That is, in an effort to add to the speed and convenience of microwave cooking, it has become highly desirable to package products in such a way so that they can be put directly into the microwave oven without the need for additional dishes or utensils.

There is a problem, however, with using such dual packaging for certain meat products, namely those which release excessive amounts of liquids, i.e. moisture, melted fats, and oils, during cooking. Bacon is an example of a meat product which releases a relatively large amount of liquids, i.e. melted fats and oils, during cooking. Thus, one of the several difficulties in designing a package for direct microwave cooking of bacon has been the fact that such a large amount of fats and oils which are released from the bacon during cooking. Likewise, hamburger and sausage patties have presented the same problem, i.e. the abundance of liquids released from the patty during cooking. Thus, it has been impractical to package hamburger and sausage patties in a package which could be used for cooking.

The inventors of the present invention have devised a package adapted to facilitate microwave cooking of bacon, and bacon-like products. This package is the subject of U.S. patent application Ser. No. 06/938,532, filed the same day as the present application and assigned to the same assignee. The entire disclosure of this co-pending application is incorporated herein by reference. Among other features, the package described in the co-pending application includes a blotter means below the stack of meat slices. This blotter is important to the operation of the package because it allows the melted fats and oils to drain from the meat slices. In addition, it was found to aid in the cooking of the meat product because the melted fats and oils within the blotter still absorb microwave energy and thereby the blotter itself acts as a second source of heat to thereby increase the cooking uniformity and efficiency of the package.

One problem with incorporating a blotter within a package of sliced meat is the fact that the blotter is likely to absorb liquids from the meat product prior to cooking. This is undesirable for at least two reasons. First, such absorption would reduce the pre-cooked weight of the product. Thus, it would be necessary to sell the product at a lower weight. Second, absorbing the liquids from the product before cooking may detrimentally affect the flavor, texture, and/or consistency of the product when cooked.

The problem of pre-cooking absorption can be exacerbated when the blotter is used in a package which is sealed with a vacuum. That is, the blotter in a vacuum package is more likely to draw liquids out of the meat product.

Accordingly, there is presented a need for a blotter means which can absorb liquids released from the meat products during cooking, and yet prevent absorption of liquids prior to cooking.

SUMMARY OF THE INVENTION

In general, the present invention is an absorbent pad for use below a meat product or the like during storage and during cooking. The pad includes a blotter means adapted to absorb liquids released from the meat product during cooking. In order to prevent substantial absorption prior to cooking, the pad also includes a heat shrinkable film adjacent the top surface of the blotter means, which film is partially attached to the blotter so as to leave at least one area which is not attached to the blotter means. The film also includes at least one opening feature, e.g. a perforation or pre-weakened area, in the at least one area which is not attached to the blotter means. As a result, when the pad is subjected to heat during cooking, the film around the perforation or weakened point shrinks so as to open a hole through the film to thereby allow liquids released from the meat product to pass into the blotter.

In accordance with one preferred embodiment of the present invention, the absorbent pad is adapted to be used to lay under a shingled stack of bacon and functions to absorb the melted fats and oils released from the bacon during microwave cooking. In this preferred embodiment, the blotter means is generally rectangular and is made from absorbent molded paper pulp. The heat shrinkable film is a heat stable 50 gauge H. S. Mylar polyester film. The film is attached about the entire periphery of the blotter as well as in bands across the width and across the length of the blotter. Accordingly, rows and columns of rectangular unattached areas are created. A generally linear perforation, or slit, is cut through the center of each of these unattached areas. During cooking, the film around the slits shrinks so as to produce oval shaped holes through the film. These oval shaped holes allow moisture, melted fats, and oils released from the bacon during cooking to pass into blotter.

The present invention thus provides the advantage of preventing absorption of liquids during storage of the product while yet being capable of absorbing liquids released from the meat product during cooking. Thus, the blotter of the present invention can be incorporated into packages used for cooking a meat product without adversely affecting the weight or quality of the meat product prior to cooking. It is also advantageous that the shift from the non-absorbent mode to the absorbent mode is accomplished automatically, i.e. in response to the heat of cooking.

These and other advantages of the present invention will become apparent in light of the following detailed description of the preferred embodiments of the invention.

BRIEF DESCRIPTION OF THE DRAWINGS

The present invention will be more clearly understood from the following detailed description of specific embodiments, read in conjunction with the accompanying drawings, wherein:

FIG. 1 is a perspective view of a bacon package employing the absorbent pad of the preferred embodiment of the present invention;

FIG. 2 is a cross-sectional view taken along line 3—3 of FIG. 1;

FIG. 3 is a perspective view showing a preferred embodiment of the present invention before cooking;

FIG. 4 is a view similar to FIG. 1 of the absorbent pad after cooking;

FIG. 5 is a cross-sectional view taken along line 5—5 of FIG. 3;

FIG. 6 is a perspective view of an alternative embodiment before cooking;

FIG. 7 is a perspective view of the embodiment shown in FIG. 6 after cooking;

FIG. 8 is a perspective view of another alternative embodiment of the present invention before cooking;

FIG. 9 is a perspective view of the embodiment shown in FIG. 8 after cooking.

DETAILED DESCRIPTION

Referring to the drawings, FIGS. 1 and 2 shows a bacon package made according to the applicants' co-pending application referred to above. As mentioned, this package is adapted to contain and protect the bacon during storage and also to facilitate cooking the bacon in a microwave oven. At present, because of the large amount of fat typically released from bacon during cooking, and also because of the need for a blotter which will not absorb liquids from the bacon prior to cooking, this package is the most preferred use for the blotter of the present invention.

However, it is certainly within the scope of this invention to use the blotter with other package designs and with other meat products. For example, hamburger and sausage patties and links are known to release a fair amount of liquids during cooking. Accordingly, packages which are designed to be used for also cooking hamburger and sausage will also benefit by incorporating the blotter of the present invention. Generally, the blotter of the present invention can be used with any package designed to be cooked and with any meat product which tends to release liquids during cooking. It should also be born in mind that the term "cooking," in addition to its customary meaning, is intended to include reheating of a product already cooked as well as finishing the cooking of a product already partially cooked.

The package shown in FIGS. 1 and 2 includes four slices of bacon 12. As mentioned in the co-pending application, these slices are preferably natural bacon, i.e. slice from a slab. However, other bacon-like products can also be used. Examples of such products are processed bacon, i.e. where pieces of meat and fat are extruded and then slice, and artificial bacon, i.e. made from an alternative source of protein such as textured vegetable protein. Preferably, the slices of bacon 12 are arranged in a shingled stack as shown.

Between each slice of bacon 12 is a separating sheet 14. This sheet is preferably a sheet of silicone treated paper which is heat and oil resistant. The purpose of the sheets 14 is to prevent the bacon from fusing together during cooking. In addition, the sheets 14 were found to aid in the draining of melted fats and oils from the slices, and also to aid in achieving more uniform cooking.

Below the shingled stack of bacon slices 12 is a blotter 16. The blotter is sized so as to protrude about one half inch around the periphery of the bacon stack. Further details regarding the blotter 16 the will be provided below.

Surrounding the bacon slices and the blotter is an overwrap which consists of a top sheet 22 and a bottom sheet 24 which are sealed about their periphery by a seal 26. Preferably, the top sheet is transparent and the bottom sheet is opaque. Also, it is preferable to form the seal 26 in such a way so that it will partially release in response to increased pressure inside the package during cooking. In this way, the package is automatically vented during cooking.

Further details of this package are provided in the Specification and drawings of the present inventors' co-pending application.

FIG. 3 is a perspective view of a preferred embodiment of the present invention before being subjected to the heat of cooking. The blotter 30 in this embodiment, which is used under a stack of bacon, is generally rectangular in shape. Naturally, the shape of the blotter will depend on the shape of the meat product, or products, under which it is used. For example, a round blotter would likely be preferred for use below a traditionally shaped hamburger patty.

For reasons of simplicity in manufacturing and filling the packages, it is presently preferred that the blotter 30 is generally flat. Alternatively, the blotter can be made with a lip around its periphery so as to better retain the liquids released during cooking.

The blotter 30 includes an absorbent means 32. This absorbent means is made from a material which will absorb liquids which are released from the meat product during cooking. Preferably, the material used is some form of absorbent paper. Most preferably, the material is an absorbent molded paper pulp. Molded paper pulp is preferred because of its typically high capacity for absorbing liquids. For example, commercially available forms of molded pulp can absorb between about one and about five times its weight in liquids. In addition, molded paper pulp is generally simple to form into the desired shapes and sizes. Other paper products suitable for the absorbent means include corrugated cardboard, and absorbent paper pulp products.

For reasons of simplicity, it is preferred for the absorbent means to comprise a single material such as paper pulp. However, in alternative embodiments, the absorbent means is layered with different materials having different absorbent characteristics. In addition, it may be desirable to use a top layer for the absorbent means which is more suitable for contacting the surface of the meat product than the absorbent material below.

It is desirable that at least the top layer of the absorbent means posses some degree of rigidity. This is to resist distortion of the blotter when the heat shrinkable film shrinks.

Adjacent the top surface of the absorbent layer 32 is a heat shrinkable film 34. The film used in this invention must shrink in response to the increased temperatures encountered during cooking. In addition, the film should be substantially impermeable to the liquids released from the meat product. In addition, because the film will likely be adjacent to the meat product, it is important that it be food acceptable. For example, the film should not dissolve, melt or otherwise degrade in the environment of the package during storage or when subjected to the temperatures of cooking. Preferably, the film is opaque and colored differently from the absorbent means. In this way, the operation of the automatic passages would be most noticeable to the consumer. However, a transparent or like-colored film may also be preferred if it is deemed better to avoid calling attention to the passages.

Most preferably, the film used in this embodiment is a 50 gauge Mylar polyester film. For example, the polyester film sold by DuPont under the designation "H. S. Mylar" is well-suited for use in the preferred embodiment the present invention. This particular film is preferred because of its stability encountered during cooking. In other words, this film will shrink at the temperatures seen during cooking yet will not melt or otherwise degrade.

The film 34 is partially attached to the absorbent layer 32 in such a way so as to leave at least one area unattached. In the embodiment shown, this is accomplished by attaching the film 34 to the absorbent means 32 according to the pattern marked by the dashed lines 37, 38, and 39. In particular, the film 34 is attached to the absorbent means 34 about the periphery of the blotter in the area between the dashed lines 35 and the four edges. The film 34 is also attached in two lengthwise strips between the dashed lines 38 and in three widthwise strips between the dashed lines 39.

In alternative embodiments, rather than being adhered about the whole periphery, the film is adhered only along the long edges of the absorbent layer. That is, the two ends of the film are not adhered. Also, it is not required to adhere the film between opening features as it is in the preferred embodiment shown. In other words, the attachment about only part of the periphery may be enough attachment depending on the particular embodiment. However, it has been found that attaching the film about the whole periphery and between each opening feature is preferred. In particular, this has been found to cause the opening features to open in a more uniform and predictable manner. In addition, it has also been found to better guarantee that the film will not become disattached from the absorbent means.

The attachment of the film to the absorbent means can be accomplished through various means. In particular, some type of adhesive may be used. Also, the film may be attached by forming a thermal or other type of direct bond between the film and the absorbent means. Naturally, whatever is used should be completely suitable for use with food products. Presently, adhesives are preferred.

An important feature of the attachment pattern is that at least one area is left unattached to the absorbent means. Thus, in embodiments such as that shown in FIG. 6, the film is attached only about its periphery.

The film 34 includes opening features 36 which can be either perforations or pre-weakened areas, both being represented by the lines 36 in FIG. 2. The term "pre-weakened area" is meant to include an area which has been mechanically (e.g. physical indenting), thermally (e.g. indenting with a hot probe or a beam from a laser), or chemically treated (e.g. etching with acid or the like) etc. to thereby make it subject to tearing apart to thereby create a passage through the film when the film around it shrinks due to increased temperatures.

In alternative embodiments, the opening features comprise unattached areas of the film located between an attached area and the outer edge of the film. When subjected to heat, the "outer" unattached areas shrink and are drawn toward the attached areas, thus exposing the outer portion of the absorbent means. This embodiment, however, is not preferred because the film has a tendency to curl as it shrinks.

In still other alternative embodiments, the opening features in the film comprise a combination of perforations, pre-weakened areas, and unattached "outer" areas. For example, the opening feature can include a series of pin holes separated by pre-weakened sections of the film.

Due to simplicity, perforations are presently preferred over pre-weakened areas or combinations. However, because using pre-weakened areas results in no possible passage through the film 34 prior to cooking, they may be preferred for certain applications.

The perforations may be formed in various ways. Most preferred is to simply mechanically cut the film. Alternatively, the film may be cut by means of a beam from a laser or a heated probe.

The preferred form for the perforations or the pre-weakened area is generally linear. Thus, the perforations most preferably take on the form of a rather narrow slit through the film 34. Other shapes are also possible, providing they do not expose significant surface area of the absorbent means. Thus, curved lines, such as crescents, etc. would be suitable. However, circles or other "open" shapes would not be desirable unless they are of relatively small size. For example, the embodiment shown in FIG. 8 includes relatively small holes, i.e. "pin holes" through the film. Although the shape of the perforation in that embodiment is open, because the size is small, it would not permit significant passage of liquids into the absorbent means prior to cooking.

The number and size of the opening features 36 will depend on the various factors. Naturally, the amount of liquids and the rate at which those liquids are to be absorbed by the blotter will dictate the total surface area of the absorbent means which should be exposed during cooking. In addition, the degree to which the film should be attached to the blotter will also dictate whether several small features or one large feature are to be used. For example, the blotter 60 shown in FIG. 6 is attached only about its periphery and includes just one long slit. Presently, it is preferred to include rows and columns of features 36 which are separated by areas of the film which are attached to the absorbent means 32.

FIG. 5 is a cross-sectional view of the embodiment shown in FIG. 3. As seen, the film 34 is adjacent to the top surface of the absorbent means 32. The slits 36 pass through the film 34. In certain embodiments, it may be desirable to include a bottom sheet 33 of a material which is impermeable to the liquids released from the meat. This bottom sheet 33 would be helpful in retaining the liquids within the absorbent means. Likewise, side sheets can also be attached around the four sides of the absorbent means.

FIG. 4 shows the blotter of FIG. 3 after it has been subjected to the elevated temperatures of cooking. As can be seen, the features 36 of FIG. 3 have been replaced by passages 42. This is caused by the shrinkage of the film around the features 36. As the film shrinks, the opening is expanded until the generally oval shaped passages 42 are left. Naturally, the areas of film which were attached to the absorbent means remain unchanged. As a result, the blotter 30 has automatically, i.e. in response to the heat of cooking, changed from a non-absorbent mode to an absorbent mode.

FIG. 6 shows an alternative embodiment wherein only one slit 66 was cut in the film 64. The film was attached to the absorbent means 62 about its periphery between the dashed lines 67 and the edge of the blotter.

FIG. 7 shows the size and shape of the passage 72 which is created when the blotter 60 is cooked. As can be seen, the passage 72 is relatively large and would allow for a larger degree of contact between the meat product and the absorbent layer.

FIG. 8 shows another alternative embodiment wherein several small holes 86, i.e. pin holes, are cut into the film 84.

FIG. 9 shows the shape and size of the passages 92 that are created upon subjecting this embodiment to the temperatures of cooking.

EXAMPLES

The following examples are provided by way of explanation of various embodiments of the present invention and as such should not be seen as limiting in any way the scope of this invention.

In Example 1, a 3" by 9" piece of 250 pound C-flute corrugated cardboard was used as the absorbent medium. A sheet of the H. S. Mylar polyester film described above was used as the heat shrinkable film. An array of 18 slits was cut into this film on 1.5" centers along the length of the film and 1" centers along the width. Each slit was approximately ⅛" long. The film was attached to the cardboard through the use of 5/16" wide double faced tape. The tape was laid about the entire periphery of the board and two evenly spaced strips were laid across the length of the board, and 5 evenly spaced strips were laid across the width of the board. Although this tape is not compatible with the temperatures and oils which the blotter would see in use, it was used in these examples because of its availability at the time of testing. Other, more preferable methods of attachment are clearly known in the art. In addition, although a molded paper pulp board is preferred for use with this invention, the C-flute corrugated cardboard was used because of its availability.

The blotter described in the preceding paragraph was incorporated into a bacon package as described in the inventors' co-pending application. In particular, four slices of bacon were used. These slices each weighed approximately 0.75 oz. and were approximately 3/32" thick, 1" wide and 8.5" long. These bacon slices are identical to those sold by ARMOUR FOOD COMPANIES under the designation Armour Star Pan Size Bacon—12 oz. The separating sheets used in this example were silicone treated papers. The overwrap was a top and bottom sheet of E-Z Peel film sealed with a thermal seal about ¼" from the edges of the blotter.

This package was placed in a typical microwave oven sold for home use, i.e. an oven sold by Quasar under the designation "Insta-matic ™ " with variable power. The power was set at medium, i.e. 490 watts, and the package was cooked for 4 minutes. Upon inspection, it was observed that the slits in the polyester film had opened into oval shaped passages which were about ⅞" long and about ⅜" wide. It was also observed that the opening of the passages had allowed the melted fats and oils pass from the stack of bacon into the corrugated cardboard.

Example 2 was performed the same as Example 1 except that the corrugate cardboard measured 4"×10" and the configuration of the opening features was changed. In addition, instead of incorporating the board into a bacon package, the board by itself was heated in a microwave oven to observe the opening behavior. The pattern of opening features consisted of three ⅛" slits in a line each separated from each other by 1/16". These sets of three slits were arranged in rows running across the length of the film with ¼" between each set in the row. Six such rows which were spaced about ½" from each other were included in the board. The 5/16" double faced tape was laid around the periphery of the board equidistant between the rows and columns of slits.

The blotter of Example 2 was heated in the above-referred-to microwave oven on the high setting for 40 seconds. After this heating it was observed that about 70 percent of the sets of slits had opened into single oval shaped holes.

Example 3 was performed the same as Example 2 except that the configuration of opening features was changed. In particular, an 18 by 6 array of pin holes was cut into the film. Each pin hole was about 1/32" in diameter. The 5/16" double faced tape was laid around the periphery of the board and equidistant between the rows and columns of pin holes. Upon heating the blotter, the pin holes enlarged to about 1/16" in size.

Example 4 was performed the same as Example 2 except that six evenly spaced 8" slits were cut into the film across the length of the blotter. The 5/16" tape was used about the periphery of the board and lengthwise between the slits. Upon heating, the slits converted to ovals, approximately 8" long and 3/16" wide.

Example 5 was performed the same as Example 4 except that six evenly spaced 8" rows of alternating slits and indented areas were used for the opening features. In particular, each row consisted of ¼" slits with ⅛" indented areas between. The 5/16" tape was laid about the periphery of the board and between the rows. Upon heating, it was observed that about 60 percent of the slits opened so as to separate the film through the indented areas.

Example 6 was performed the same as Example 1, i.e. with the same slit pattern, except that the double face tape was used only about the periphery of the board. In addition, this board was not put into a bacon package, but heated by itself in a microwave oven. Upon heating, it was observed that the slits opened into oval passages, although the size of the passages was not uniform throughout the sheet. In particular, some of the passages were larger and some were smaller than the passages created in Example 1.

It is thus seen that the present invention provides a blotter for use with a meat product which automatically converts from a mode wherein the liquids released from the meat product are not absorbed to a mode wherein they are.

Although much of the description of embodiments has involved the use of the blotter in packages for bacon slices, it should be noted that the blotter of the present invention is suited for use with other meat products which release liquids during cooking such as hamburgers patties, sausage links and patties, etc. In addition, although much of the description has involved the use of the blotter in packages cooked by microwave energy, the blotter of the present invention is not limited to such applications, that is, the blotter may be used for cooking in a conventional or other types of ovens. Certainly, these and other variations which are within the ordinary skill in the art to make are considered to lie within the scope of the invention as defined by the following claims.

We claim:

1. A blotter for use below a meat product during storage and during cooking which blotter is adapted to absorb liquids released from the meat product during cooking, and adapted to substantially avoid absorbing liquids from the meat product during storage, which blotter comprises:

absorbent means comprised of a material which will absorb liquids released from the meat product;

a heat shrinkable film adjacent the top surface of the absorbent means, which film is partially attached to the absorbent means so as to leave at least one area which is not attached to the absorbent means, the film further comprising at least one opening feature in the film in the at least one area which is not attached to the absorbent means, whereby when the blotter is subject to heat during cooking, the film around the at least one opening feature shrinks to thereby automatically create an opening through which liquids released from the meat product can pass into the absorbent means.

2. The blotter of claim 1 wherein the opening feature is a perforation through the film.

3. The blotter of claim 1 wherein the opening feature is a pre-weakened area in the film.

4. The blotter of claims 1, 2, or 3 wherein the absorbent means comprises molded paper pulp.

5. The blotter of claim 1 comprising a plurality of opening features arranged generally in an array of rows and columns.

6. The blotter of claim 2 wherein the perforation is a narrow slit through the film.

7. The blotter of claim 2 comprising a plurality of perforations, each perforation being in the form of a small pin hole.

8. A blotter for use below a meat product during storage and during cooking which blotter is adapted to absorb liquids released from the meat product during cooking, and adapted to substantially avoid absorbing liquids from the meat product during storage, which blotter comprises:

an absorbent means comprised of an absorbent paper product and adapted to absorb liquids released from the meat product during cooking;

a heat shrinkable film adjacent the top surface of the absorbent means, which film is attached to said absorbent means at least about part of the periphery of the absorbent means so as to leave at least one area which is not attached to the absorbent means, which film comprises at least one generally linear perforation through said film in the at least one area which is not attached to the absorbent means whereby when the blotter is subject to heat during cooking, the film around the at least one perforation shrinks to thereby automatically create an opening through which liquids released from the meat product can pass into the absorbent means.

9. The blotter of claim 8 wherein the film comprises an array of rows of generally linear perforations.

10. The blotter of claim 9 wherein the film is attached to the absorbent means about the entire periphery of the absorbent means, and between the rows of generally linear perforations.

11. The blotter of claim 8 wherein the film comprises an array of rows and columns of generally linear perforations.

12. The blotter of claim 11 wherein the film is attached to the absorbent means about the entire periphery of the absorbent means, between the rows and between the columns of generally linear perforations.

13. The blotter of claim 8 wherein the film comprises only one generally liner perforation.

* * * * *

UNITED STATES PATENT AND TRADEMARK OFFICE
CERTIFICATE OF CORRECTION

PATENT NO. : 4,720,410

DATED : January 19, 1988

INVENTOR(S) : Burton R. Lundquist et al.

It is certified that error appears in the above-identified patent and that said Letters Patent is hereby corrected as shown below:

IN THE DETAILED DESCRIPTION

In column 3, line 55, please delete "slice" and substitute therefor --sliced--.

In column 4, line 1, after "16" please delete "the".

In column 4, line 52, please delete "posses" and substitute therefor --possess--.

In column 5, line 9, after "ment" please insert --of--.

IN EXAMPLES

In column 7, line 63, please delete "corrugate" and substitute therefor --corrugated--.

Signed and Sealed this

Sixth Day of June, 1989

Attest:

Attesting Officer

DONALD J. QUIGG

Commissioner of Patents and Trademarks